United States Patent [19]

Kiss et al.

[11] Patent Number: 4,498,789
[45] Date of Patent: Feb. 12, 1985

[54] METHOD OF AND APPARATUS FOR MEASURING SURFACE TEMPERATURE OF MOVING OBJECTS, PARTICULARLY MEASURING THE TEMPERATURE OF FIBROUS PRODUCTS PARTICULARLY OF WIRES DURING PRODUCTION

[75] Inventors: László Kiss; Árpád Faludi, both of Budapest; Gyula Gróf, Kesztölc; László Bolyó, Budapest; Csaba Szölgyén, Budapest; István Mihádák, Budapest; Imre Varga, Budapest, all of Hungary

[73] Assignee: Hiradástechnikai Gépgyár, Hungary

[21] Appl. No.: 436,401

[22] Filed: Oct. 25, 1982

[30] Foreign Application Priority Data

Oct. 23, 1981 [HU] Hungary .............................. 3111/81

[51] Int. Cl.³ ............................................. G01K 7/00
[52] U.S. Cl. ..................................... 374/164; 374/166
[58] Field of Search ............... 374/153, 164, 165, 166, 374/154, 137, 167, 132, 134; 148/3, 128; 266/87, 90; 72/13

[56] References Cited

U.S. PATENT DOCUMENTS

| 2,872,173 | 2/1959 | Monker | 266/87 |
| 3,496,033 | 2/1970 | Gilbreath et al. | 266/87 |
| 4,229,236 | 10/1980 | Heath | 148/128 |
| 4,243,441 | 1/1981 | Wilson | 148/128 |
| 4,408,903 | 10/1980 | Baldasarri | 72/13 |

Primary Examiner—Charles Frankfort
Assistant Examiner—David R. Schuster
Attorney, Agent, or Firm—McGlew and Tuttle

[57] ABSTRACT

The invention relates to a method of and an apparatus for measuring surface temperature of especially moving objects, advantageously measuring the temperature of fibrous products, and particularly of wires during production. The essence of the method lies in that two concentric shells not being contiguous with either the object to be measured or with one another are fitted to the object to be measured, temperature is sensed in the two end locations and in the central region of the inner shell, and in the central region of the outer shell, these values are brought to be equal to the value measured in the central region of the inner shell by dissipation or by heat transfer (heating), then temperature is measured in the central region of the inner shell. The essence of the apparatus lies in that it comprises two concentric shells separated from one another, an inner sensing and an outer compensating shell, being provided with heated surfaces, and dissipating elements, respectively. The method and the apparatus according to the invention are suitable for measuring surface temperature of moving elements, particularly of wires, fibres, strips moving at a speed of 0 to 65 m/s, irrespective of surface quality, material, or relatively low temperature ranges, where temperature radiation is hard to measure.

10 Claims, 2 Drawing Figures

METHOD OF AND APPARATUS FOR MEASURING SURFACE TEMPERATURE OF MOVING OBJECTS, PARTICULARLY MEASURING THE TEMPERATURE OF FIBROUS PRODUCTS PARTICULARLY OF WIRES DURING PRODUCTION

FIELD AND BACKGROUND OF THE INVENTION

The invention relates to a method of and an apparatus for measuring surface temperature of linearly moving and/or rotating objects, and advantageously for measuring the temperature of fibrous products, particularly of wire during production. In the method according to the invention a measuring head is fitted to the object to be measured. The method and apparatus according to the invention are suitable for measuring surface temperature of moving objects at a high accuracy, and it allows an accurate measurement of the surface temperature particularly in the wire production, in a wide speed range of the wire transfer (up to the speed of 65 m/s).

Fibrous products produced in high volume, among them wires, are usually produced by technologies with continuous issue. The quality of the products is considerably influenced by the temperature during production, which has to be kept for this very reason at a constant value. The same task can also be met e.g. in case of a rotary furnace equipment, i.e. in case of large dimensions, when accurate knowledge of the surface temperature is also required. The diameter and/or thickness, the speed of movement (rotation) of the products (and of the object to be measured) can vary in a wide range of values. Temperature can be kept within the designated range only if the apparatus measuring the temperature is able to follow the varying parameters with proper flexibility and it affords accurate measurement even under varying conditions.

Two basic types of used for measuring surface temperature of moving (rotating) objects are the temperature measuring means which contact and those which do not contact the object to be measured.

By the temperature measuring means being contiguous with the object to be measured a relatively high accuracy can be achieved in case of non-moving objects. If, however, a heat receiving element is in contact with the surface of moving objects, and consequently moving elements are employed in them, their accuracy is low. In many cases accuracy is even smaller than 25 percent. The abrasive effect of the moving surface can be considerable, particularly in wire production.

The apparatus of type NCT-4500 (with WIRETEMP trade mark) was developed for measuring surface temperature of moving wires or fibres. Its essence lies in that the object to be measured is strained on a proper element of the apparatus, then the object to be measured is calibrated before starting the measurement, depending on the diameter, quality of material, speed of the object and the expected temperature range. This renders the apparatus uncomfortable to manipulate.

The known basic principles of the non-contacting measurement of temperature are based on the measurement of radiation. Their basic problem is that a material of extremely uneven surface, and accordingly, of varying emission factor is to be measured, and these changes can not be foreseen. Consequently the result of measurement is burdened with considerable error. The result is also strongly influenced by cleaness of the medium of measurement.

SUMMARY OF THE INVENTION

The invention is aimed at providing a contact-free method, and apparatus, respectively, while eliminating the mentioned inadvantageous features, which allow accurate measurement of surface temperature of objects moving at different speeds, mainly of fibrous products, wires of different material, size, surface quality and temperature.

The invention is based on the perception that by bringing the object to be measured into thermic balance with the measuring means a measurement of high accuracy can comfortably be carried out, based on heat transport.

Based on this perception a method of and an apparatus for measuring surface temperature of moving objects, and advantageously for measuring the temperature of fibrous products, particularly of wires during production, were developed. According to the method, a measuring head is fitted to the object to be measured, and the measuring head is formed as two concentric shells fitted to the object and separated from the surfaces of the other shell and of the object, temperature is sensed on both ends of the measuring head and on both shells, in their central regions, the temperature of the two end locations and of the central region of the outer shell is made to be equal with the value representing the central region of the inner shell, then temperature is measured in the central region of the inner shell. The apparatus according to the invention comprises a sensing shell measuring the temperature of the object to be measured, where the shell is fitted to and separated from said object, and a compensating shell being separated from and concentric with the sensing shell, where both ends of the sensing shell and the compensating shell are provided with a heated surface, and with a heat dissipating element, respectively.

The surface temperature of moving solids of different geometry and dimensions can at a high accuracy be measured even in contaminated medium by way of the method and apparatus according to the invention.

The apparatus according to the invention can advantageously be formed in such a way that its sensing shell and its compensating shell comprise two parts fitting to one another along two longitudinal axes each. This solution allows the apparatus to be opened and closed.

The sensing shell, and, if it is necessary, the compensating shell are advantageously formed as a cylinder with a circular base. The two outside thermometers of the sensing shell, and the corresponding heating surfaces, respectively, are advantageously connected separately to a common terminal each, particularly for measuring wires or fibres moving at a high speed. The dissipating elements connected to the sensing and compensating shells are made of such material and in such dimensions, and are mounted in such a way, respectively, that the time constant of cooling and heating be identical as regards to the apparatus.

BRIEF DESCRIPTION OF THE DRAWINGS

The invention will now be further described, purely by way of example, on a preferred method and an embodiment, respectively, with reference to the accompanying drawing, in which.

DESCRIPTION OF THE PREFERRED EMBODIMENT

According to the method of the invention, a measuring centre is assigned to the object to be measured, beside its longitudinal axis. One measuring location perpendicularly to, while two measuring locations parallel with the longitudinal axis are designated symmetrically relative to the measuring centre. The latter two measuring locations are arranged in concentric shells not being contiguous with the measuring centre, while the remaining single measuring location is arranged on a concentric shell being contiguous neither with the object to be measured, nor with the other shells, and these locations are provided with thermometers. Temperature values are sensed in the measuring locations and in the measuring centre and if they deviate from the value measured in the measuring centre, they are brought to the same value by dissipation of heat or by heating applied in the measuring locations. When temperature in the four measuring locations is identical the temperature of the measuring centre is measured and this is the required surface temperature.

Figure 1:
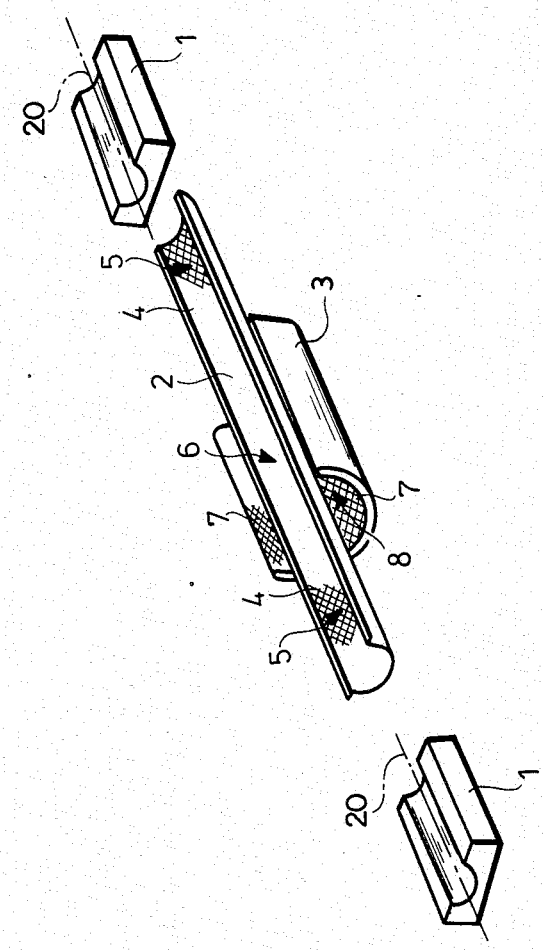
FIG. 1 is a schematic view of the apparatus according to the invention.

The apparatus according to the invention (FIG. 1) measures the surface temperature of the object to be measured on a sensing shell 2. The object which is elongated moves on a path 20. The inner surface of the sensing shell 2 is not contiguous or in contact with the outer surface of the object to be measured. If necessary, guide elements 1 provide for the attenuation of vibration of the object (indicating improper technology of production) and for its proper guiding. This keeps the object spaced from the shell 2. For indicating that the object to be measured is in contact with the guide element 1, the latter can be provided with known units. Its inner diameter (inside dimension) is smaller than that of the sensing shell 2. Accordingly, it is achieved, that the object to be measured should exactly be in the central line of the sensing shell 2, the bodies of air carried along with it can not get into the apparatus. The sensing shell 2 is encircled by a concentric, compensating shell 3 which is separated from it. The compensating shell 3 is arranged symmetrically even longitudinally relative to the sensing shell 2, and it is usually shorter than the latter. Both shells are in connection with dissipating elements not shown in the figure. They are fixed advantageously near the end points of the sensing shell 2 and in the central range of the compensating shell 3, respectively, and they usually serve also for support. A thermometer 6 for determining the temperature of the measured object is arranged in the central range of the sensing shell 2, while near each of its opposite end points a sensing thermometer or temperature sensor 5 and a heated surface 4 are formed. A sensing thermometer or temperature sensor 8 and a heated surface 7 are arranged in the central range of the compensating shell 3.

Figure 2:
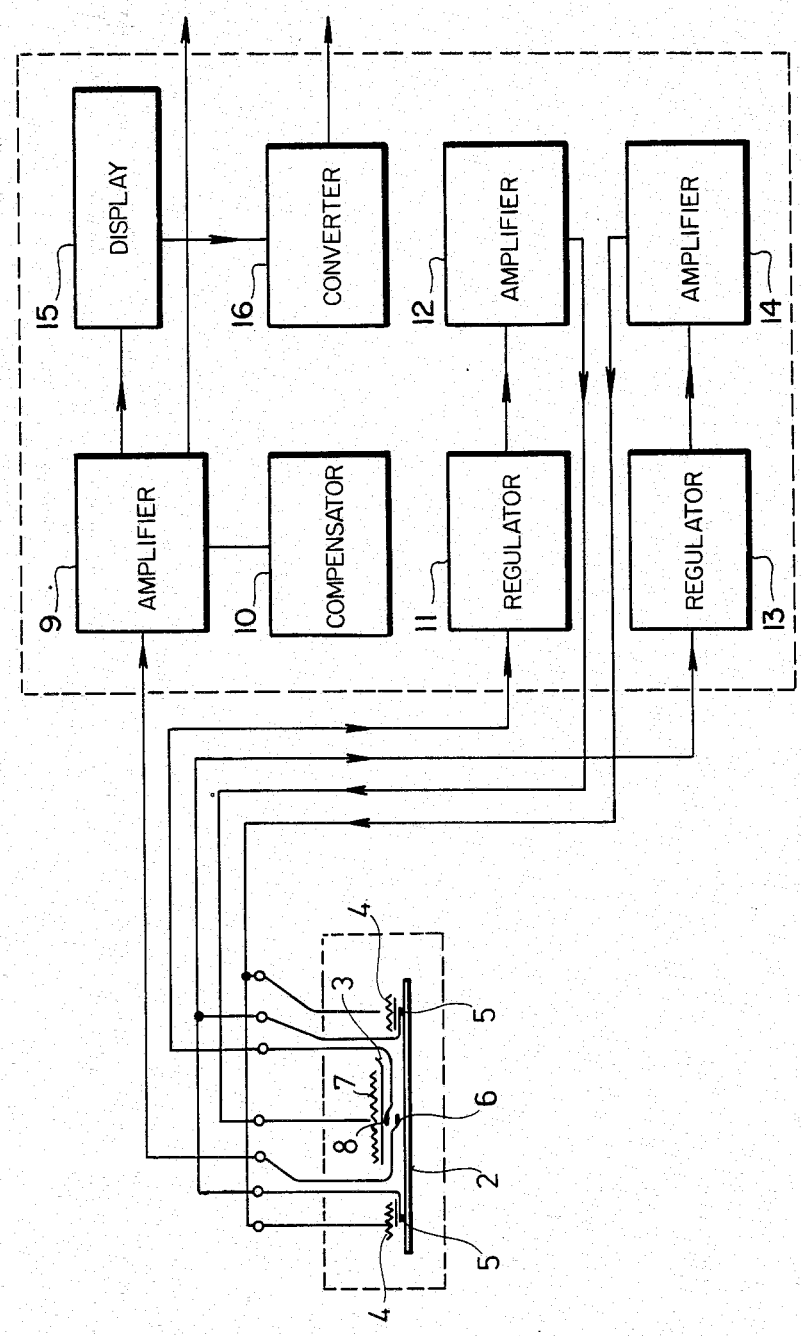
FIG. 2 is a schematic view of the apparatus according to the invention and of the electronic circuit related to it.

The apparatus is connected to an electronic unit (FIG. 2). Under the conditions of wire and fibre production the two heated surfaces 4 arranged at the two ends of the sensing shell 2 and the two sensing thermometers 5, respectively, are connected to a common terminal. The signal corresponding to sensing arrives at a regulator 13, from there it is sent to a power amplifier 14 controlling the power supply of the heated surfaces 4. In a similar way, the signal of the sensing thermometer 8 of the compensating shell 3 arrives at a regulator 11, from it to a power amplifier 12 controlling the power supply of the heated surface 7. The signal of the thermometer 6 is processed by an amplifier 9 and is sent to an analog display 15, and then to an analog-digital converter 16. In case of sensing thermometers 5, 7 and a thermometer 6 having thermoelement, the proper accuracy, and the independence of the thermometers from environmental temperature is achieved by a cold-junction compensator 10.

By properly co-ordinating the regulators 11 and 13, by heating the heated surfaces 4 and 7 or by heat dissipation following the switch-off of heating, the temperature of the measured object can be set to be identical with the temperature measured by the thermometer 8. Then each point of the sensing shell 2 and of the compensating shell 3 are of the same temperature, accordingly the thermometer 6 indicates the requires temperature. Advantageously, the thermoelements are made of such material and are so arranged that the time constants of heating and cooling are identical, in case of the given heating surfaces 4, 7.

According to the invention, each of the sensors 5,5 and 8 are associated with a heater 4,4 and 7. Heating is obtained by activating the individual heaters using the circuitry of FIG. 2 and cooling is obtained by deactivating the heaters and permitting heat to dissipate to the surroundings. A cold or unheated temperature sensor 6 is also provided in shell 2 in the vicinity of the fiber or elongated moving product whose surface temperature is to be measured. The cold or unheated temperature sensor 6 is ultimately used to obtain this measurement of surface temperature for the object. Before reading this temperature, however, the control circuit of FIG. 2 is operated to selectively activate or deactivate the heaters 4,4 and 7 until the temperature readings of each of the sensors 5,5 and 8 is equal. At this point, the temperature on sensor 6 (which is also now equal to the temperature at sensors 5,5 and 8) is taken as a measurement of the surface temperature of the object. Equalization of the temperatures at the two ends of the sensing shell 2 as well as around the central area of the sensing shell (as shielded by the compensating shell 3 and measured by sensor 8) causes sensor 6 to provide an accurate measurement of the surface temperature of the object.

The compensating shell 3 and the sensing shell 2 can be composed also of two halves matching into one another. Thus, e.g. under conditions of wire production, the apparatus can easily be transferred. The shape of the cross-section of the shells must be chosen according to the measurement task, i.e. ellipsoidal cross-section is employed in case of e.g. strip-like materials. If objects not accomplishing linear movement are to be measured, the shape of the shells may copy the shape of the object to be measured.

The surface temperature of moving objects can be measured at a high accuracy by way of the method and the apparatus according to the invention, irrespectively of the quality of material, of the speed of movement (of rotation), of dimensions, of surface conditions, of the contamination level of environment, or of heat effects of the environment, of the external air movements. It can be used particularly in the low temperature range, where the intensity of heat radiation is low, and is thus difficult to measure. The apparatus is less sensitive to mechanical effects than known devices.

We claim:

1. A method of measuring surface temperature of moving objects, especially of fibrous products or wires during production, comprising the steps of: arranging a moving object to move past one side of a sensing shell having a first and second surface of controlled and measured temperature, and past a cold point of the sensing shell; arranging in compensating element having a controlled temperature over said cold point on another side of said sensing shell; measuring the temperature of said first and second surfaces, of said cold point and of said another side of said sensing shell and, when their temperature values are different, varying the temperature of said first and second surfaces and of said another side of said sensing shell by said compensating element in order to equalize the temperatures with the temperature of said cold point.

2. A method according to claim 1, wherein said first and second surfaces are at opposite ends of the sensing shell, said cold point being at a central location on said sensing shell with said compensating element surrounding at least a portion of the central portion of the sensing shell, the method including measuring the surface temperature of the moving object at said cold point when the temperatures of said first and second surfaces and of said sensing shell at its other side are equal.

3. An apparatus for measuring surface temperature of an object moving in a path, in particular an elongated object during production of the elongated object, comprising:
a sensing shell extending partly along the path and at least partly surrounding the path, said sensing shell having a first surface facing the path and an opposite surface facing away from the path;
a first temperature sensor associated with said sensing shell for measuring a first temperature at one end of said sensing shell first surface;
a second temperature sensor associated with said sensing shell for measuring a second temperature at an opposite end of said sensing shell first surface;
a compensating shell at least partly surrounding said second surface of said sensing shell at an intermediate location of said sensing shell;
a third temperature sensor associated with said sensing shell and said compensating shell for measuring a third temperature at an intermediate location of said sensing shell second surface;
controllable heating means associated with said first, second and third temperature sensors and disposed at said one end and said opposite end of said sensing shell first surface and said intermediate location of said sensing shell second surface for controlling temperatures at said one end and said opposite end of said sensing shell first surface and said intermediate location of said sensing shell second surface;
control means connected to said controllable heat means for controlling heating to cause said first, second and third temperatures to become equal to each other; and
a fourth temperature sensor associated with said sensing shell for sensing a fourth temperature at an intermediate location of said sensing shell first surface between said one end and said opposite end of said first surface, said fourth temperature being a measurement of the surface temperature of an object moving on the path when said first, second and third temperatures are equal to each other.

4. An apparatus according to claim 3, wherein said compensating shell is shorter along the path than said sensing shell, said first and second temperature sensors positioned at opposite ends of said sensing shell and each being spaced away from said compensating shell.

5. An apparatus according to claim 4, including a first guide element defining a channel for receiving the path on one end of said sensing shell and a second guide element defining a channel for receiving the path at an opposite end of said sensing shell.

6. An apparatus according to claim 3, wherein said sensing shell and said compensating shell are in the shape of an at least partial cylinder, said compensating shell having a radius greater than said sensing shell.

7. An apparatus according to claim 5, wherein said sensing shell and said compensating shell are in the shape of an at least partial cylinder, said compensation shell having a radius greater than said sensing shell.

8. An apparatus according to claim 3, wherein said intermediate location of said second surface is at a center of said sensing shell.

9. An apparatus according to claim 3, wherein said controllable heating means comprises a first heater adjacent said first temperature sensor, a second heater adjacent said second temperature sensor and a third heater adjacent said third temperature sensor, said control means comprising a first regulator connected to said first and second temperature sensors, a first amplifier connected to said first regulator and connected to said first and second heaters for controlling said first and second heaters to equalize said first and second temperatures, a second regulator connected to said third temperature sensor, a second amplifier connected to said second regulator and to said third heater for regulating said third temperature to be equal to said first and second temperatures and an amplifier connected to said fourth temperature sensor for amplifying a signal from said fourth sensor corresponding to said fourth temperature.

10. An apparatus according to claim 7, wherein said controllable heating means comprises a first heater adjacent said first temperature sensor, a second heater adjacent said second temperature sensor and a third heater adjacent said third temperature sensor, said control means comprising a first regulator connected to said first and second temperature sensors, a first amplifier connected to said first regulator and connected to said first and second heaters for controlling said first and second heaters to equalize said first and second temperatures, a second regulator connected to said third temperature sensor, a second amplifier connected to said second regulator and to said third heater for regulating said third temperature to be equal to said first and second temperatures and an amplifier connected to said fourth temperature sensor for amplifying a signal from said fourth sensor corresponding to said fourth temperature.

* * * * *